No. 681,339. Patented Aug. 27, 1901.
J. F. PACK.
PINEAPPLE EYE SNIP.
(Application filed Jan. 11, 1901.)

(No Model.)

Witnesses
H. R. Selden.
C. G. Cramwell.

Inventor
John F. Pack,
By Geo. B. Selden,
Attorney

THE NORRIS PETERS CO., PHOTO-LITHO., WASHINGTON, D. C.

UNITED STATES PATENT OFFICE.

JOHN F. PACK, OF ROCHESTER, NEW YORK.

PINEAPPLE-EYE SNIP.

SPECIFICATION forming part of Letters Patent No. 681,339, dated August 27, 1901.

Application filed January 11, 1901. Serial No. 42,873. (No model.)

*To all whom it may concern:*

Be it known that I, JOHN F. PACK, a citizen of the United States, residing at Rochester, New York, have invented an Improved Pineapple-Eye Snip, of which the following is a specification, reference being had to the accompanying drawings.

My invention relates to an improved eye snip or clipper designed to remove the eyes from the outer surface of pineapples or other vegetables.

My invention is fully described and illustrated in the following specification and the accompanying drawings, the novel features thereof being specified in the claims annexed to the said specification.

Figure 1:
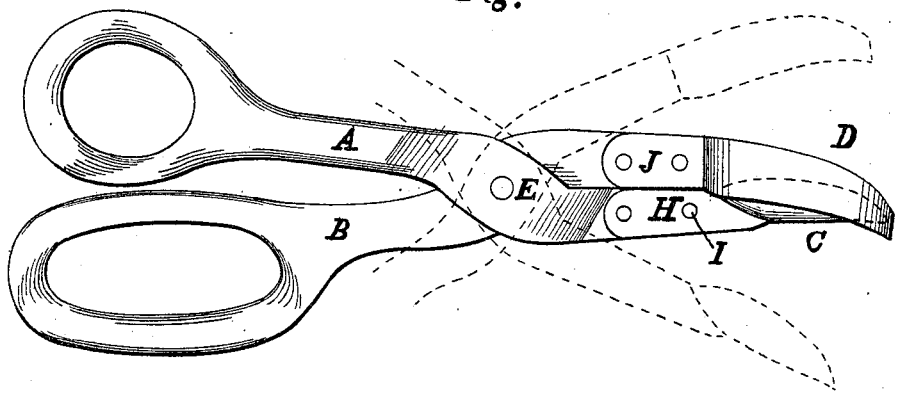
Figure 2:
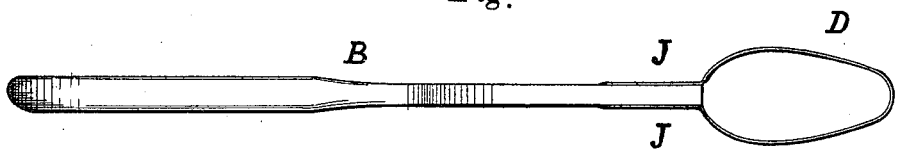
Figure 3:
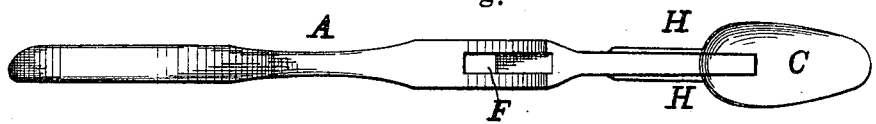
Figure 4:
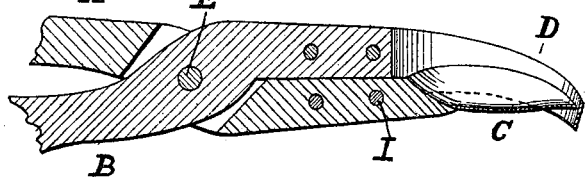

In the accompanying drawings, Figure 1 is a side view. Fig. 2 represents one of the handles and the cutter. Fig. 3 represents the other handle and the spoon. Fig. 4 is a longitudinal section showing the cutter and spoon closed.

A and B represent the handles of my improved eye-snip, C the spoon, and D the cutter. The handles are pivoted together at E, and they are provided with any suitable grips or handholds, whereby they are adapted to opening or closing the cutter and spoon, as represented by the full and dotted lines in Fig. 1. In the construction shown the handle A is provided with a recess F, through which the end of the handle B is passed; but any other suitable arrangement may be adopted. The spoon and cutter are given a suitable oval form, adapted when operating together to remove the eye or other objectionable part of the cuticle. The spoon is of a suitable oval outline, hollow or concave on the side toward the cutter and provided with the wings H on each side of the arm A, secured thereto by the screws or rivets I. The end of the arm A is made to correspond with the concavity of the spoon, which is slotted between the wings H to receive the arm. The edges of the spoon are made sharp and adapted to coact with the cutter in the removal of the hard or refuse parts of the cuticle. The cutter D is formed to correspond on its interior with the outer edges of the spoon, and it is provided with the plates J, by which it is secured to the end of the arm B by suitable screws or rivets.

The spoon and the cutter are made of steel, and they are preferably hardened and adapted to engagement with each other accurately in any way the constructor may prefer.

I claim—

1. A pineapple-eye snip comprising a pair of handles having a hollow cutter and spoon attached thereto, the said spoon adapted to be operated within said hollow cutter, substantially as described.

2. In a pineapple-eye snip, the combination with a pair of handles having a hollow cutter and spoon attached thereto, of a cutting edge provided on said cutter, the said spoon adapted to be moved past said cutting edge and into said hollow cutter, substantially as described.

3. In a pineapple-eye snip, the combination with a pair of pivoted handles, of a hollow oval-shaped cutter provided with a cutting edge, and an oval-shaped spoon mounted on said handles, the said spoon adapted to move within said hollow cutter in proximity to said cutting edge, substantially as described.

JOHN F. PACK.

Witnesses:
   C. G. CRANNELL,
   GEO. B. SELDEN.